US011321650B2

(12) United States Patent
Anandan Kartha et al.

(10) Patent No.: US 11,321,650 B2
(45) Date of Patent: May 3, 2022

(54) SYSTEM AND METHOD FOR CONCURRENT DYNAMIC OPTIMIZATION OF REPLENISHMENT DECISION IN NETWORKED NODE ENVIRONMENT

(71) Applicant: Tata Consultancy Services Limited, Mumbai (IN)

(72) Inventors: Padmakumar Manikandasadanam Anandan Kartha, Bangalore (IN); Dheeraj Anilkumar Shah, Mumbai (IN); Harshad Dilip Khadilkar, Thane (IN); Vinita Baniwal, Thane (IN); Hardik Meisheri, Thane (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 113 days.

(21) Appl. No.: 16/656,065

(22) Filed: Oct. 17, 2019

(65) Prior Publication Data

US 2020/0126015 A1    Apr. 23, 2020

(30) Foreign Application Priority Data

Oct. 17, 2018   (IN) .............................. 201821039466

(51) Int. Cl.
*G06Q 10/06*   (2012.01)
*G06N 20/00*   (2019.01)
*G06Q 30/02*   (2012.01)

(52) U.S. Cl.
CPC ....... *G06Q 10/06315* (2013.01); *G06N 20/00* (2019.01); *G06Q 30/0283* (2013.01)

(58) Field of Classification Search
CPC ............ G06Q 10/087; G06Q 30/0202; G06Q 10/067; G06Q 20/203; G06Q 50/28;
(Continued)

(56) References Cited

U.S. PATENT DOCUMENTS 6,144,945 A * 11/2000 Garg .................... G06Q 10/087
705/28
6,249,774 B1 * 6/2001 Roden .................. G06Q 10/087
705/28

(Continued)

OTHER PUBLICATIONS

Reltek Advanced Inventory Planning 11.1—User Guide—Warehouse Replenishment Planning Retek Inc., 2004 (Year: 2004).*

(Continued)

*Primary Examiner* — Scott L Jarrett
(74) *Attorney, Agent, or Firm* — Finnegan, Henderson, Farabow, Garrett & Dunner LLP

(57) ABSTRACT

This disclosure provides a system and method for concurrent dynamic optimization of a replenishment decision in a networked node environment by receiving at least one current state attribute associated with the networked node environment at a predetermined time interval; obtaining an optimized entity actionable matrix by mapping the at least one of current state attribute and an associated actionable entity; computing a predictive replenishment matrix for an impending cycle of the networked node environment based on the optimized entity actionable matrix; identifying a reward function for the predictive replenishment matrix; and determining the replenishment suggestive actionable element based on the reward function. The reward function includes a computation of overall cost with regard to a realized revenue associated with aggregation of the plurality of nodes.

6 Claims, 5 Drawing Sheets

(58) Field of Classification Search
CPC ........... G06Q 10/06315; G06Q 10/063; G06N 20/00; G06N 3/08
See application file for complete search history.

(56) References Cited

U.S. PATENT DOCUMENTS

| | | | | |
|---|---|---|---|---|
| 6,609,101 | B1* | 8/2003 | Landvater | G06Q 10/06 705/7.25 |
| 7,383,284 | B2* | 6/2008 | Heinrichs | G06Q 10/087 |
| 7,480,623 | B1* | 1/2009 | Landvater | G06Q 10/06315 705/7.25 |
| 7,487,120 | B1* | 2/2009 | Yeh | G06Q 10/087 705/28 |
| 7,552,066 | B1* | 6/2009 | Landvater | G06Q 10/06315 705/7.25 |
| 8,725,594 | B1 | 5/2014 | Davies et al. | |
| 10,713,622 | B1* | 7/2020 | Yin | G06N 20/00 |
| 10,977,609 | B1* | 4/2021 | Adulyasak | G06Q 30/0202 |
| 2003/0004784 | A1 | 1/2003 | Li et al. | |
| 2004/0128212 | A1* | 7/2004 | Zieger | G06Q 10/087 705/28 |
| 2009/0006156 | A1* | 1/2009 | Hunt | G06Q 30/02 705/7.11 |
| 2010/0088147 | A1 | 4/2010 | Guldner et al. | |
| 2011/0208620 | A1* | 8/2011 | McCormick | G06Q 20/203 705/28 |
| 2012/0317059 | A1 | 12/2012 | Joshi et al. | |
| 2015/0032512 | A1* | 1/2015 | Bateni | G06Q 30/0206 705/7.35 |
| 2015/0254589 | A1* | 9/2015 | Saxena | G06Q 10/087 705/7.25 |
| 2015/0379449 | A1* | 12/2015 | Gopinath | G06Q 10/087 705/7.25 |
| 2015/0379450 | A1* | 12/2015 | Nomoto | G06Q 10/08 705/7.25 |
| 2017/0185933 | A1* | 6/2017 | Adulyasak | G06Q 10/06315 |
| 2017/0323250 | A1* | 11/2017 | Lindbo | G06Q 10/08345 |
| 2018/0204267 | A1* | 7/2018 | Licht | G06Q 30/0635 |
| 2018/0218322 | A1* | 8/2018 | Bhargava | G06Q 10/0875 |
| 2019/0073611 | A1 | 3/2019 | Sahota et al. | |
| 2019/0087529 | A1* | 3/2019 | Steingrimsson | G06N 3/0454 |
| 2019/0236740 | A1* | 8/2019 | Rao | G06Q 10/067 |
| 2020/0090110 | A1* | 3/2020 | Sewak | G06Q 10/087 |

OTHER PUBLICATIONS

Mayne, D.Q et al., Constrained model predictive control: Stability and optimality Automatic, vol. 36, 2000 (Year: 2000).*
Oracle Retail Advanced Inventory Planning—Store Replenishment Planning User Guide Release 13.0 Oracle, Jun. 2008 (Year: 2008).*
Meisheri, Hardik et al., Using Reinforcement Learning for Large Variable-Dimensional Inventory Management Platform ALA, 2020 (Year: 2020).*
Oroojlooyjadid, A. et al. (2019). "A Deep Q-Network for the Beer Game: Reinforcement Learning for Inventory Optimization," retrieved from https://arxiv.org/pdf/1708.05924.pdf. (40 pages).
Sustrova, T. (2016). "An Artificial Neural Network Model for a Wholesale Company's Order-Cycle Management," *International Journal of Engineering Business Management;* pp. 1-6.
Boru, A. et al. (2019). "A Novel Hybrid Artificial Intelligence Based Methodology for the Inventory Routing Problem," *Symmetry,* vol. 11, No. 5; pp. 1-16.
Bala, P.K. (2010). "Purchase-driven Classification for Improved Forecasting in Spare Parts Inventory Replenishment," *International Journal of Computer Applications,* vol. 10, No. 9; pp. 40-45.
Sui, Z. et al. (2010). "A Reinforcement Learning Approach for Inventory Replenishment in Vendor-Managed Inventory Systems With Consignment Inventory," *Engineering Management Journal,* vol. 22, No. 4; pp. 44-53.
Taghizadeh, E. (2009). "Utilizing artificial neural networks to predict demand for weather-sensitive products at retail stores," retrieved from https://arxiv.org/ftp/arxiv/papers/1711/1711.08325.pdf. (10 pages).
Wang, C.E. (2009). "Supply Chain Inventory Strategies using Fuzzy Neural Networks," retrieved from https://www.semanticscholar.org/paper/Supply-Chain-Inventory-Strategies-using-Fuzzy-Wee-Wang/a28fc735547707f696253429e718851a08a50382. (4 pages).

* cited by examiner

SYSTEM AND METHOD FOR CONCURRENT DYNAMIC OPTIMIZATION OF REPLENISHMENT DECISION IN NETWORKED NODE ENVIRONMENT

PRIORITY CLAIM

This U.S. patent application claims priority under 35 U.S.C. § 119 to Indian Application No. 201821039466, filed on Oct. 17, 2018. The entire contents of the aforementioned application are incorporated herein by reference.

TECHNICAL FIELD

This disclosure relates generally to optimization process, and, more particularly, to a system and method for concurrent dynamic optimization of replenishment decision in a networked node environment.

BACKGROUND

Replenishment planning (e.g., in retail) is triggered based on a demand forecast, store inventory levels, sales, replenishment schedules and various replenishment parameters (shelf capacity, safety stock, lead times, shelf life etc.). These inputs are used to compute quantity of each product that must be supplied to each store, in order to maintain sufficient stock to meet customer demand. Currently, entire replenishment process starts with creation of suggested store order quantity looking at demand forecast, item level attributes (shelf life, pack quantity, etc.), store attributes (shelf capacity, safety stock, min pres., etc.), inventory levels and various replenishment parameters (schedules, lead times, etc.) which are pre-dominantly static and based on pre-set rules. The suggested orders are taken as fixed requirements for a warehouse and a transportation network, and are first executed in the warehouse in best possible way that suits warehouse operations and subsequently in transport operations. Thus, while the order quantities are optimized from point of view of stores, the efficiency of rest of the supply chain is hampered by the one-way propagation of requirements. The current system also doesn't consider future delivery quantities and adjust current order appropriately (stock build-up or ramp-down).

In this sense, the current replenishment system is a pure pull-based system, where the replenishment quantities are demanded by stores and have to be met by the rest of the supply chain. Local optimization of replenishment quantities without cognizance of operational capacity throughout the supply chain has huge implications on product availability and wastage. Typically, these localized optimizations are done through disparate systems using classical optimization approaches which have certain inherent pitfalls: a. Localized sequential optimization by independent modules without any joint information sharing resulting in overall suboptimal operations, b. Hand off between modules lead to noise and difficulties in course correction, resulting in inability to adapt to business dynamics, c. Time consuming execution and computationally infeasible to re-run frequently in-turn affecting the delivery times to stores and customers, d. No learnings from historical data and minimal simulation of operational environment leveraged in optimization decision, e. Static rules, large periodicity (high latency) and incapable of dynamic changes in short time.

Traditional replenishment planning involves dealing with a moving target, since each component's target or objective is only relevant to the localized optimization step for process/function under consideration. In initial step (store replenishment), availability of products in store is the objective and when the plan goes through subsequent processes, which may undergo optimization to leverage volume benefits from supplier, or at operational level it may undergo warehouse pick optimization and transport load optimization.

In this scenario of sequential optimization following problems, as representative examples, occur: (i) On shelf availability may get impacted if the transport or warehouse capacity is constrained and if the system decides to forego some of the suggested replenishment quantity; (ii) If more quantity is picked and delivered than the original suggestion to fill the trailer capacity, this may potentially result in storage issues at the stores and product obsoleteness or wastage; (iii) The impact of changes made to quantities, by downstream systems, across stores is not considered, hence increasing or reducing the quantity at a later stage is not typically decided based on the potential to sell at every store; (iv) The impact of changes made to quantities, by downstream systems, across current and future delivery schedules is also not considered.

SUMMARY

Embodiments of the present disclosure present technological improvements as solutions to one or more of the above-mentioned technical problems recognized by the inventors in conventional systems. For example, in one aspect, a processor implemented method of concurrent dynamic optimization of replenishment suggestive actionable element in a networked node environment is provided. The processor implemented method includes at least one of: receiving, via one or more hardware processors, at least one current state attribute associated with the networked node environment at a predetermined time interval; obtaining, via the one or more hardware processors, an optimized entity actionable matrix by mapping the at least one of current state attribute and an associated actionable entity; computing, via the one or more hardware processors, a predictive replenishment matrix for an impending cycle of the networked node environment based on the optimized entity actionable matrix; identifying, via the one or more hardware processors, a reward function for the predictive replenishment matrix; and determining, via the one or more hardware processors, the replenishment suggestive actionable element based on the reward function. In an embodiment, the reward function includes a computation of overall cost with regard to a realized revenue associated with aggregation of the plurality of nodes.

In an embodiment, the at least one current state attribute may include at least one of (i) product levels across a plurality of stores in the networked node environment, (ii) real-time tracking information of plurality of delivery vehicles, (iii) availability of labor in the predetermined time interval, and (iv) inventory levels of the plurality of products in the networked node environment. In an embodiment, the optimized entity actionable matrix may include a plurality of parameters associated with corresponding the at least one of current state attribute. In an embodiment, the predictive replenishment matrix may include a plurality of nodes and a plurality of pre-trained historical parameters. In an embodiment, the at least one suggestive actionable element may correspond to at least one decision.

In another aspect, there is provided a processor implemented system for concurrent dynamic optimization of replenishment suggestive actionable element in a networked node environment is provided. The system comprises a memory storing instructions; one or more communication interfaces; and one or more hardware processors coupled to the memory via the one or more communication interfaces, wherein the one or more hardware processors are configured by the instructions to: receive, at least one current state attribute associated with the networked node environment at a predetermined time interval; obtain, an optimized entity actionable matrix by mapping the at least one of current state attribute and an associated actionable entity; compute, a predictive replenishment matrix for an impending cycle of the networked node environment based on the optimized entity actionable matrix; identify, a reward function for the predictive replenishment matrix; and determine, at least one suggestive actionable element based on the reward function. In an embodiment, the reward function includes a computation of overall cost with regard to a realized revenue associated with aggregation of the plurality of nodes.

In an embodiment, the at least one current state attribute may include at least one of (i) product levels across a plurality of stores in the networked node environment, (ii) real-time tracking information of plurality of delivery vehicles, (iii) availability of labor in the predetermined time interval, and (iv) inventory levels of the plurality of products in the networked node environment. In an embodiment, the optimized entity actionable matrix may include a plurality of parameters associated with corresponding the at least one of current state attribute. In an embodiment, the predictive replenishment matrix may include a plurality of nodes and a plurality of pre-trained historical parameters. In an embodiment, the at least one suggestive actionable element may correspond to at least one decision.

In yet another aspect, there are provided one or more non-transitory machine readable information storage mediums comprising one or more instructions which when executed by one or more hardware processors causes at least one of: receiving, via one or more hardware processors, at least one current state attribute associated with the networked node environment at a predetermined time interval; obtaining, via the one or more hardware processors, an optimized entity actionable matrix by mapping the at least one of current state attribute and an associated actionable entity; computing, via the one or more hardware processors, a predictive replenishment matrix for an impending cycle of the networked node environment based on the optimized entity actionable matrix; identifying, via the one or more hardware processors, a reward function for the predictive replenishment matrix; and determining, via the one or more hardware processors, the replenishment suggestive actionable element based on the reward function. In an embodiment, the reward function includes a computation of overall cost with regard to a realized revenue associated with aggregation of the plurality of nodes.

In an embodiment, the at least one current state attribute may include at least one of (i) product levels across a plurality of stores in the networked node environment, (ii) real-time tracking information of plurality of delivery vehicles, (iii) availability of labor in the predetermined time interval, and (iv) inventory levels of the plurality of products in the networked node environment. In an embodiment, the optimized entity actionable matrix may include a plurality of parameters associated with corresponding the at least one of current state attribute. In an embodiment, the predictive replenishment matrix may include a plurality of nodes and a plurality of pre-trained historical parameters. In an embodiment, the at least one suggestive actionable element may correspond to at least one decision.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
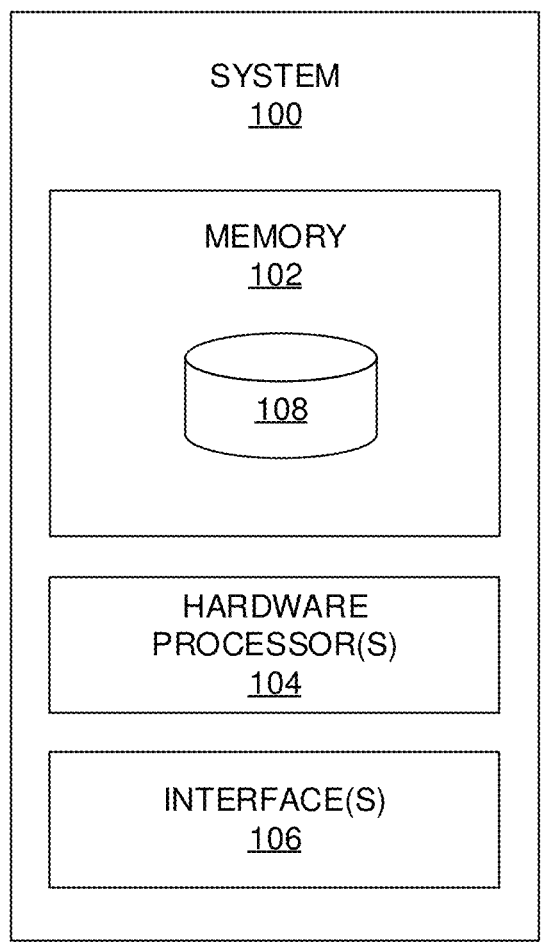
FIG. 1 is a block diagram illustrates concurrent dynamic optimization of replenishment decision according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 is a block diagram illustrates concurrent dynamic optimization of replenishment decision, according to an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules and a repository for storing data processed, received, and generated by the plurality of modules. The plurality of modules may include routines, programs, objects, components, data structures, and so on, which perform particular tasks or implement particular abstract data types.

Further, the database 108 stores information pertaining to inputs fed to the system 100 and/or outputs generated by the system 100 (e.g., data/output generated at each stage of the data processing), specific to the methodology described herein. More specifically, the database 108 stores information being processed at each step of the proposed methodology.

The repository, amongst other things, includes a system database and other data. The other data may include data generated as a result of the execution of one or more modules in the plurality of modules.

Figure 2:
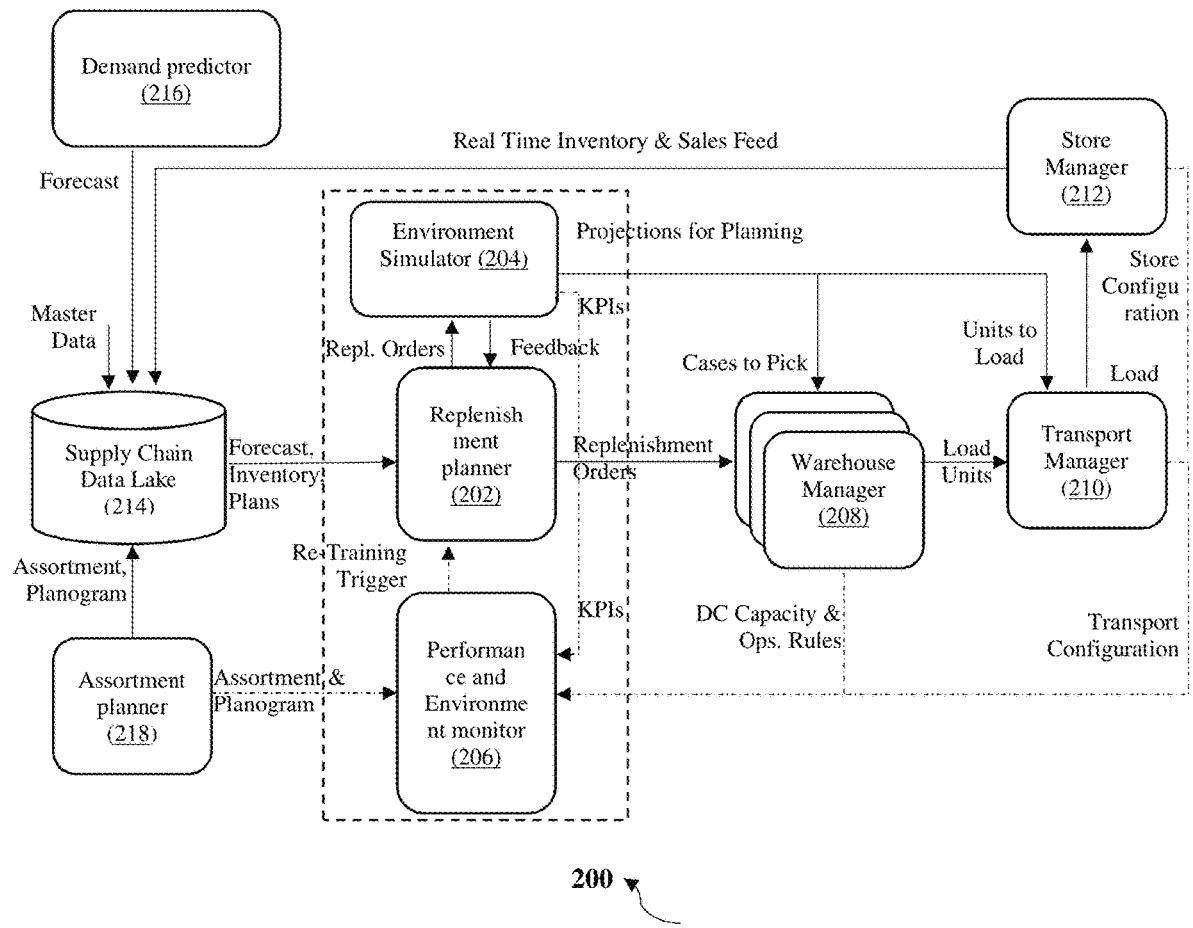
FIG. 2 is an exemplary block diagram illustrates concurrent dynamic optimization of replenishment decision of a networked node environment, according to an embodiment of the present disclosure.

FIG. 2 is an exemplary block diagram illustrates concurrent dynamic optimization of replenishment decision of a networked node environment, according to an embodiment of the present disclosure. In an embodiment, the decision corresponds to a suggestive actionable element. In an embodiment, a networked node environment corresponds to a supply chain network. A replenishment decision system 200 includes a replenishment planner 202, an environmental simulator 204, a performance and environment monitor 206, a warehouse manager 208, a transport manager 210, a store manager 212, a supply chain data lake 214, a demand predictor 216, and an assortment planner 218. The replenishment planner 202 is configured to determine optimal replenishment quantity per item per stocking location e.g. stores, a distribution center (DCs), etc. The replenishment planner 202 is configured to import data from historical operation of all pre-existing components, in addition to one or more historical replenishment decisions, one or more forecasts, one or more predictions of upcoming demand, and one or more operational characteristics of other components of the supply chain network, including but not limited to the assortment planner 218, the demand predictor 216, and all master data of currently held inventory.

In an embodiment, an optimized entity actionable matrix is obtained by mapping the one or more current state attribute and an associated actionable entity. In an embodiment, the optimized entity actionable matrix includes a plurality of parameters associated with the corresponding one or more current state attribute. In an embodiment, one or more current state attribute associated with the supply chain network is sensed at a predetermined time interval. The one or more current state attribute includes (i) product levels across a plurality of stores in the networked node environment, (ii) real-time tracking information of plurality of delivery vehicles, (iii) availability of labor in the predetermined time interval, and (iv) inventory levels of the plurality of products in the networked node environment.

The replenishment planner 202 is configured to compute a predictive replenishment matrix for an impending cycle of the networked node environment based on the optimized entity actionable matrix. In an embodiment, the predictive replenishment matrix includes a plurality of nodes, and a plurality of pre-trained historical parameters. For example, a possible replenishment plan for upcoming cycle of the supply chain network using one or more imported data and the pre-trained parameters of the replenishment planner 202. In one exemplary implementation, the pre-trained parameters may relate to one or more parameters of an artificial neural network.

The environmental simulator 204 is configured to simulate operations and product flow. In an embodiment, the possible replenishment plan is sent to the environment simulator 204 for evaluation and feedback, where implemented in the environmental simulator 204 to obtain one or more future effects on operation of the supply chain network. The environmental simulator 204 provides feedback to the replenishment planner 202 on order decisions based on achievable overall performance. In an embodiment, the environmental simulator 204 provides projections on capacity needed during fulfillment of the generated replenishment plan. In an exemplary implementation, there may be more than one iteration of the replenishment plan and feedback exchanged between the replenishment planner 202 and the environment simulator 204. In an embodiment, a finalized plan is then computed by the replenishment planner 202 to the pre-existing components of the supply chain network, including the warehouse manager 208, the transport manager 210, and the store manager 212.

In an embodiment, the environment simulator 204 further provides additional information regarding the possible replenishment plan, in order to ensure smooth coordination between the pre-existing components. In an embodiment, the additional information includes but not limited to a case-wise allocation of inventory, and an allocation of specific units to specific vehicles in a transportation system.

The performance and environment monitor 206 is configured to monitor the performance of replenishment decisions as well as changes in the environment. In an embodiment, the replenishment planner 202 may be retrained and the environmental simulator 204 may need to be adjusted based on a trigger from the performance and environment monitor 206. The performance and environment monitor 206 operates in parallel to the flow, continuously measuring one or more efficiency indicators. In an embodiment, when certain rules within the performance and environment monitor 206 are triggered, a re-parameterization of the replenishment planner 202 is triggered. In an exemplary implementation, this exercise updates the parameters of an artificial neural network for future cycles of the supply chain network. The supply chain data lake 214 is configured to receive one or more required data for the replenishment planner 202 and the environmental simulator 204 to operate.

In an embodiment, demand forecast and planning information such as a store level assortment plan and a delivery plan may form a trigger for the replenishment planning. In an embodiment, real time data on inventory and sales from warehouse management and store systems provides inventory state information for engine to decide on an order quantity.

The warehouse manager 208 is configured to leverage same processing logic used in replenishment planning simulation for building loading units (e.g., pallets or roller cages).

For example, the warehouse manager 208 ensures realization of projected holistic benefit versus localized process benefit. The transport manager 210 is configured to leverage the projected loading units from the transport manager 210 to derive tactical transport plan which reserves capacity i.e., type of trailers and drivers.

In an exemplary embodiment:

Systemic 1: Simulation of the supply chain network for the replenishment planner 202 to run what-if scenarios online, to be synchronized with operational systems that executes one or more replenishment orders.

Systemic 2: Bidirectional communication and negotiation between the warehouse manager 208, the transport manager 210, and the replenishment planner 202 to arrive at system-optimal decisions. In one embodiment, this could be achieved by treating the system as a multi-agent cooperative reinforcement learning formulation, where each agent represents the interests of one component of the supply chain. In another embodiment, there could be one centralized reinforcement learning agent that computes system-optimal decisions directly.

Algorithmic 1: Use of machine learning to maximize a reward generation while adhering to one or more applicable constraints, with continual (online) training and retraining through a reinforcement learning.

Algorithmic 2: Design of a reward function to represent the feedback from previous decisions, which involves mapping a large dimensional heterogeneous system state into a scalar reward.

In an embodiment, trained algorithm is plugged into the real supply chain system of the retailer post training process, which is configured to produce one or more periodic replenishment decisions. Further, daily performance metrics are used for continual online training, enabling the algorithm to react to changes in system behavior and/or constraints. For example, real time sales and inventory consumption at stores are incorporated while calculating replenishment orders.

The demand predictor 216 is configured to segregate demand into various priorities/criticalities to determine most important component of the demand required for immediate fulfilment of needs of the plurality of nodes. The demand predictor 216 provide an ability to flex the replenishment quantities within a delivery slot or across horizon of delivery slots in order to optimize beyond availability in the supply chain network.

In an embodiment, the system leveraging multitude of machine learning and artificial intelligence techniques to create an optimized replenishment order for an item to a destination location, including but not limited to time-series forecasting using long short-term memory networks, decision-marking using reinforcement learning, and unsupervised clustering for aggregating multiple products with similar characteristics. Initially, the system is configured to learn one or more constraints and one or more rules which can maximize benefits for the retailer by concurrently looking at one or more key performance indicators (KPI) derived through environment simulation. In one exemplary implementation, usage of the reinforcement learning to minimize the overall cost to the retailer, and a combination of cost of out of stock, cost of obsoleteness/wastage and cost of the supply chain network. The concurrent holistic optimization considering the one or more KPIs and one or more constraints simultaneously to achieve the organizational goal while arriving at a replenishment quantity decision.

In an embodiment, a set of store, transport, and warehouse agents compute one or more proposed decisions relevant to their own context. For example, the transportation agent computes routing and loading of trucks, the store agent computes replenishment quantities of all products, and the warehouse agent computes labor assignments. In an embodiment, the one or more decisions are computed using a pre-trained parameters of a set of neural networks.

Figure 3A:
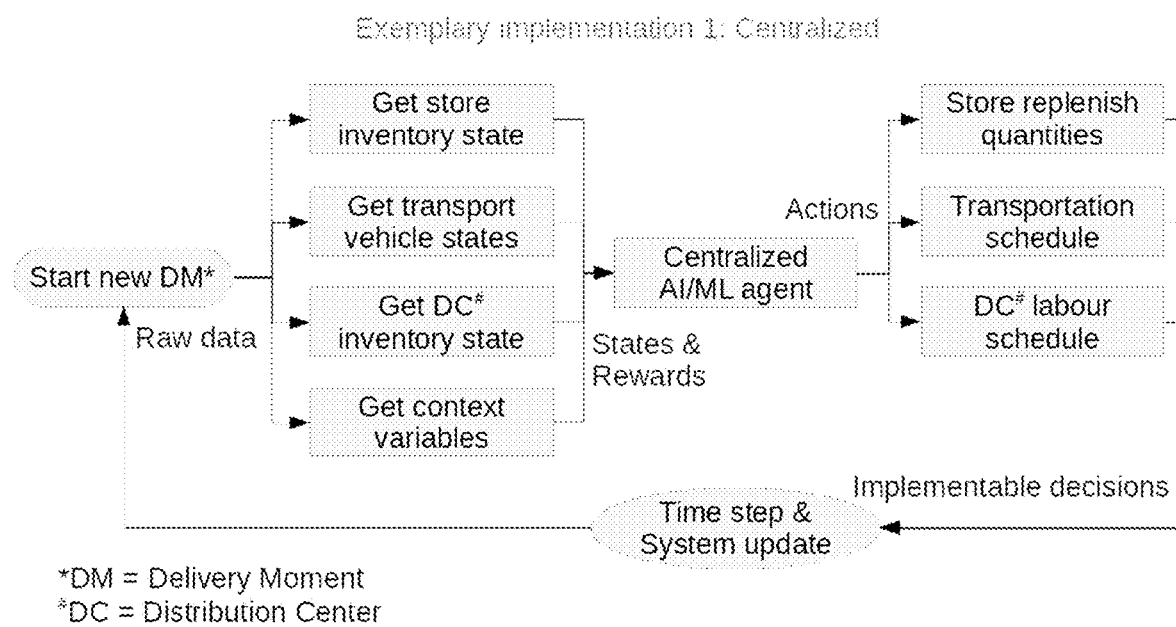
FIGS. 3A and 3B are an exemplary view illustrates of concurrent dynamic optimizing of replenishment decision, according to an embodiment of the present disclosure.
Figure 3B:
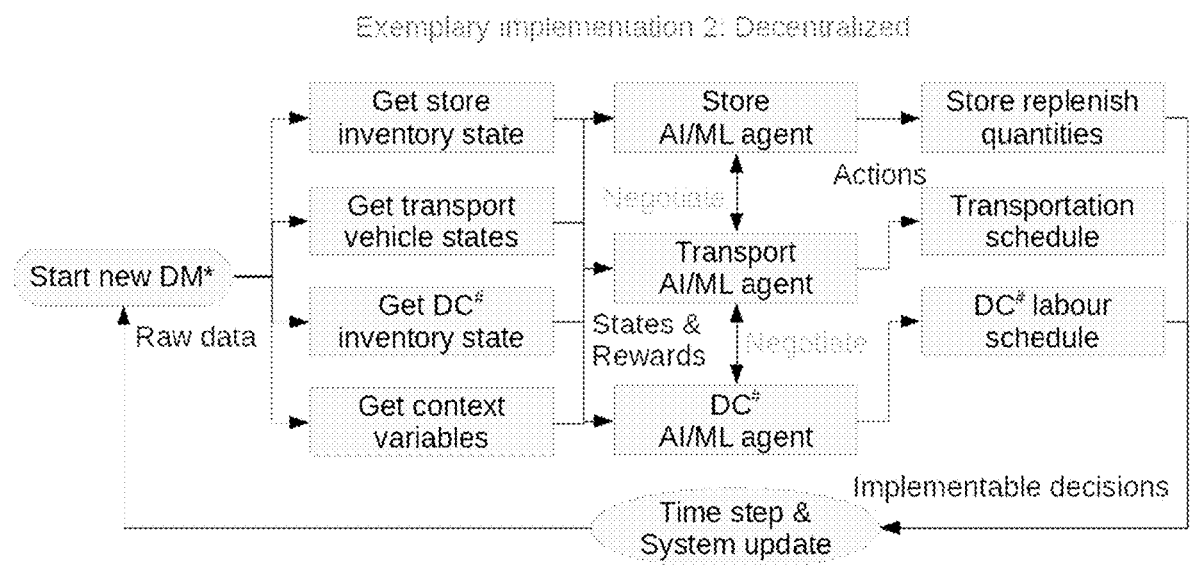

FIG. 3A-3B is an exemplary view illustrates of concurrent dynamic optimizing of replenishment decision, according to an embodiment of the present disclosure. In an embodiment, the system 100 comprises one or more data storage devices or the memory 102 operatively coupled to the one or more hardware processors 104 and is configured to store instructions for execution of steps of the method by the one or more processors 104. There are two exemplary implementations of the process flow, one with a single centralized agent for computing the actions, and another with a set of AI/ML based algorithms that negotiate to find a mutually acceptable set of actions. In both cases, there exists improvisation by integrating the optimization of the store, transportation, and DC sub-systems.

For example, every delivery moment starts by sensing the current state of the supply chain (for example, through IoT devices or information from enterprise applications such as 'Point of Sale' or any other digital mechanism to capture consumption). The raw sensed data is converted into one or more features, following which are fed to the AI/ML algorithm(s). In an embodiment, the algorithms are based on a set of techniques known as a reinforcement learning. The output is a set of actions, which are converted by post-processing (IT systems) into a set of implementable decisions. The decisions are implemented in simulation or in the real system, as the case may be, for the upcoming delivery moment. The process flow restarts in the next delivery moment.

Explanatory Example

A reward-penalty mechanism is used to teach the RL agents on how good a particular order quantity decision is, in the current context (current state). The total replenishment score can be overall reward for a particular replenishment decision. Calculation of the replenishment score is depended on projections given by the environmental simulator 204 and the one or more KPIs calculated at different levels. In initial phase of the solution, a rule based weightage can be applied on the one or more KPIs to arrive at a single replenishment score.

Consider a simple example where there are only two products: corn flakes and biscuits. A capacity of the truck that travels from DC to store, is a total of 10 boxes of either product, or some combination of them. The current inventory of corn flakes in the store is 2 boxes, and that of biscuits is 1 box (t=0). The expected demand for corn flakes and biscuits in the next time period is 2 boxes each, while that in the next time period is 8 boxes each. If only optimize for the current time period and ignore the truck capacity, the optimal store order at t=0 would be 2 boxes of each product. However, when the high demand appears in the next time period, the truck capacity is insufficient and only 5 boxes can be sent, leading to stock-out in the store (insufficient inventory).

Note: [inventory at t=1]=[inventory at t=0]+[replenishment action at t=0]−[demand in t=0].

| Product | t = 0 inventory | t = 0 demand | t = 0 action | t = 1 inventory | t = 1 demand | t = 1 action | t = 2 inventory |
|---|---|---|---|---|---|---|---|
| Corn flakes | 2 | 2 | 2 | 2 | 8 | 5* | −1 |
| Biscuits | 1 | 2 | 2 | 1 | 8 | 5* | −2 |

Instead, a reinforcement learning algorithm would learn to maximize long term reward, and would utilize the spare truck capacity at t=0 to build up stock in the store, so that inventory is sufficient throughout. Note that the total of 'action' in each time period is at most 10, which is truck capacity.

| Product | t = 0 inventory | t = 0 demand | t = 0 action | t = 1 inventory | t = 1 demand | t = 1 action | t = 2 inventory |
|---|---|---|---|---|---|---|---|
| Corn flakes | 2 | 2 | 8 | 8 | 8 | 2 | 2 |
| Biscuits | 1 | 2 | 2 | 1 | 8 | 8 | 1 |

Figure 4:
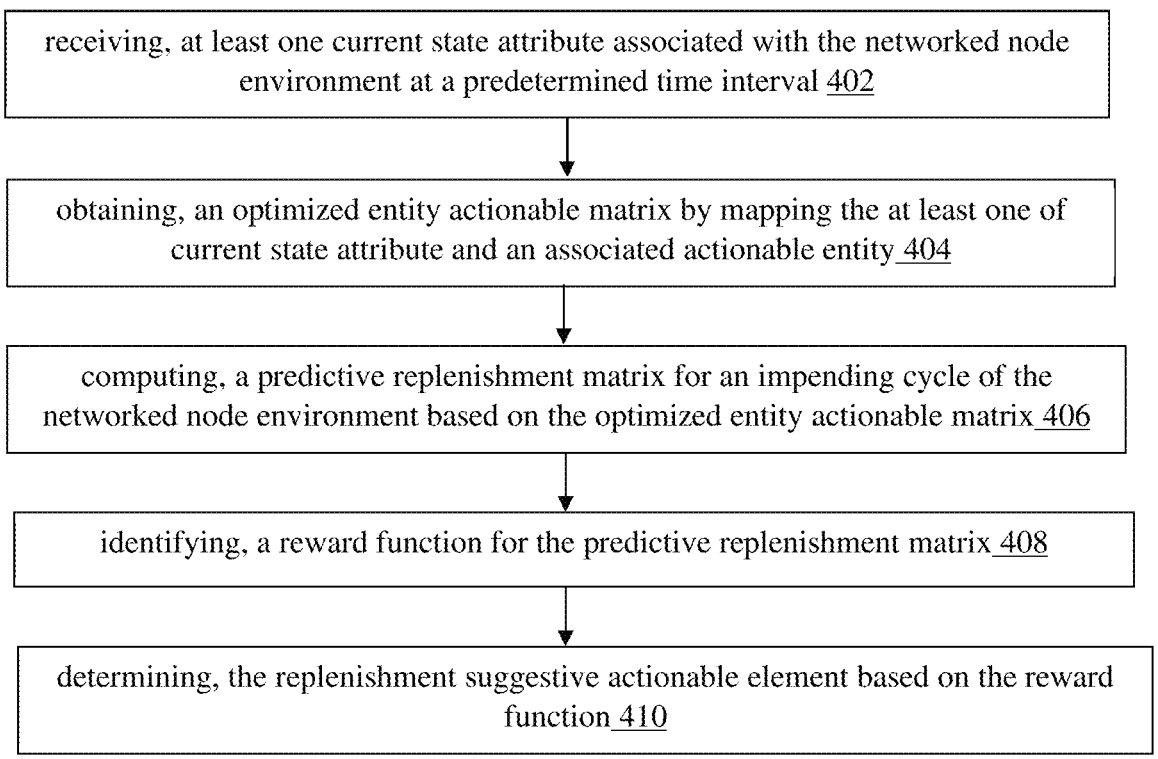
FIG. 4 is an exemplary flow diagram illustrating a method of concurrent dynamic optimization of replenishment decision, according to an embodiment of the present disclosure.

FIG. 4 is an exemplary flow diagram illustrating a method of concurrent dynamic optimization of replenishment decision, according to an embodiment of the present disclosure. In an embodiment, the system 100 comprises one or more data storage devices or the memory 102 operatively coupled to the one or more hardware processors 104 and is configured to store instructions for execution of steps of the method by the one or more processors 104. The flow diagram depicted is better understood by way of following explanation/description. The steps of the method of the present disclosure will now be explained with reference to the components of the system 200 as depicted in FIG. 2.

At step 402, at least one current state attribute associated with the networked node environment is received at a predetermined time interval. At step 404, an optimized entity actionable matrix is obtained by mapping the at least one of current state attribute and the associated actionable entity. At step 406, a predictive replenishment matrix for an impending cycle of the networked node environment is computed based on the optimized entity actionable matrix. At step 408, a reward function is identified for the predictive replenishment matrix. In an embodiment, the reward function includes a computation of overall cost with regard to a realized revenue associated with aggregation of the plurality of nodes. At step 410, the replenishment suggestive actionable element is determined based on the reward function.

In an embodiment, the at least one current state attribute includes at least one of (i) product levels across a plurality of stores in the networked node environment, (ii) real-time tracking information of plurality of delivery vehicles, (iii) availability of labor in the predetermined time interval, and (iv) inventory levels of the plurality of products in the networked node environment. In an embodiment, the optimized entity actionable matrix comprises a plurality of parameters associated with corresponding the at least one of current state attribute. In an embodiment, the predictive replenishment matrix comprises a plurality of nodes and a plurality of pre-trained historical parameters. In an embodiment, the at least one suggestive actionable element corresponds to at least one decision.

Embodiments of the present disclosure address situations when there is an exponentially larger complexity in the problem when a large number of products are involved, including (i) sharing of capacity between products leading to cannibalisation, (ii) different expiry periods for otherwise similar products requiring special handling, (iii) affinity between products allowing more efficient transport of certain combinations of products over others.

A replenishment decision system is about a replenishment operations involving generation of replenishment orders (e.g., stores/dark stores to the distribution centre (DC), the DC to vendor and stores/dark stores to vendor) through multi-dimensional concurrent optimization (covering product availability, wastage/obsoleteness and cost to serve) based on a real time demand, supply and capacity information. The solution deliver seamless capabilities to business, integrated across online and brick & mortar channels, to derive most optimal order quantity at node-item level for immediate and future delivery schedules. The objective of the invention is to arrive at replenishment orders which are tailored for needs of the destination node (e.g. stores) with least cost to the overall supply chain network in terms of out of stock, wastage and supply chain operations. The system is introduced by bidirectional information sharing and negotiation between the (traditionally) sequential components of the supply chain, thus enabling the algorithm to arrive at system-optimal solutions.

Embodiments of the present disclosure use a new approach in overcoming shortcomings of classical optimization through a concurrent machine learning based optimization mechanism by learning from the supply chain operations environment and associated history. The embodiments of the present disclosure have a clear advancement over current systems since (a) models and works with supply chain operational constraints and processes directly, by keeping the system in the loop. All replenishment order decisions are implemented directly in the real system, and rewards/training is carried out based on the results at the end of the day; (b) It is a closed-loop system, ensuring that changes to any constraints/processes within the supply chain, or to patterns in forecast and inventory consumption, are accounted for automatically without any human intervention; (c) The embodiments of the present disclosure provides a concrete (both systemic and methodical) way to optimize replenishment order quantity in a holistic manner, which directly include a business impact in terms of improved sales, reduced wastage and minimal supply chain cost; (d) The additional cost incurred by the retailer when implementing the approach is minimal, the cost incurred is in building a high fidelity environment simulation and also adjusting the simulation environment based on changing reality; and (e) Execution of the replenishment plan should be aligned with the environment simulated during the replenishment planning to derive the benefit of holistic optimization.

Embodiments of the present disclosure look at holistic benefit for the retailer while taking a decision on replenishment quantity for an item to be replenished to a stocking location which ensures highest level of availability and least product wastage through an improved capacity utilization across all operations in supply chain including the warehouse/the distribution center/fulfilment center, transportation, supplier and others.

Embodiments of the present disclosure use reinforcement learning to solve the decision-making problem, which: (i) can be used even in situations where 'right answer' (or label, in supervised learning algorithms) is not known, since RL discovers the answers on own, and (ii) there is no necessity to tune one or more parameters for every situation separately, since the algorithm specializes to each situation on own.

Embodiments of the present disclosure in which the reinforcement learning can be trained offline, where most of the computational effort are expended, provide online operation of the algorithm that is very fast. Embodiments of the present disclosure are at the convergence of multiple arts, including (i) retail supply chain domain expertise, (ii) data mining, (iii) artificial intelligence, and (iv) IT system development. In addition to the systematic complexity, the machine learning driven approach in deciding replenishment orders or plan creates an autonomous replenishment engine based on real time exploitative learning as well. This new approach also provides a faster mechanism to generate replenishment plans which will indirectly help in creating frequent plans using real time data in a given day versus once in a day planning.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of concurrent dynamic optimization of a replenishment suggestive actionable element in a networked node environment, comprising:
receiving, via one or more hardware processors, at least one current state attribute associated with the networked node environment at a predetermined time interval;
obtaining, via the one or more hardware processors, an optimized entity actionable matrix by mapping the at least one of current state attribute and an associated actionable entity;
computing, by a replenishment planner using a trained Artificial Intelligence (AI)/Machine Learning (ML) algorithm, a predictive replenishment matrix for an impending cycle of the networked node environment based on the optimized entity actionable matrix, wherein the replenishment planner is configured to import data from historical operation of all pre-existing components, in addition to one or more historical replenishment decisions, one or more forecasts, one or more predictions of upcoming demand and one or more operational characteristics of other components of the networked node environment, wherein the predictive replenishment matrix comprises a plurality of nodes and a plurality of pre-trained historical parameters, wherein the trained AI/ML algorithm is based on a technique including a reinforcement learning, wherein the AI/ML algorithm is trained offline to reduce computational effort and provides faster online operation of the trained AI/ML algorithm to generate replenishment plans, and wherein computing the predictive replenishment matrix comprising steps of:
generating a replenishment plan for an upcoming cycle of the supply chain network using the imported data and pre-trained parameters of the replenishment planner, wherein the pre-trained parameters are one or more parameters of an artificial neural network;
sending, over a network, the replenishment plan to an environmental simulator for evaluation and feedback, wherein the environmental simulator is configured by a replenishment decision system to implement the replenishment plan to simulate operations and product flow;
providing the feedback by the environmental simulator to the replenishment planner, on replenishment order decisions based on overall performance; and
computing, by the replenishment planner, the predictive replenishment matrix on the replenishment plan and feedback exchange between the replenishment planner and the environmental simulator,
wherein the replenishment planner is retrained, the pre-trained parameters of the replenishment planner are updated for future cycles of a supply chain network and the environmental simulator is adjusted based on a trigger from a performance and environment monitor regarding the performance of the replenishment plan and changes in the networked node environment;
identifying, via the one or more hardware processors, a reward function for the predictive replenishment matrix, wherein the reward function comprises a computation of overall cost with regard to a realized revenue associated with aggregation of the plurality of nodes; and
determining, by a warehouse manager or a transport manager by using the trained AI/ML algorithm, the replenishment suggestive actionable element based on the reward function, wherein the replenishment suggestive actionable element corresponds to at least one decision, wherein the reward function represent feedback from previous decisions, and wherein the replenishment suggestive actionable element is implemented by the warehouse manager or the transport manager directly in a real supply chain system and ensures highest level of availability and least product wastage through an improved capacity utilization across all operations in the supply chain network,
wherein the replenishment decision system provides bidirectional communication and negotiation between sequential components of the supply chain network over the network, and wherein the sequential components of the supply chain network include the replenishment planner, the environmental simulator, the warehouse manager and the transport manager.

2. The processor implemented method of claim 1, wherein the at least one current state attribute comprises at least one of (i) product levels across a plurality of stores in the networked node environment, (ii) real-time tracking information of plurality of delivery vehicles, (iii) availability of labor in the predetermined time interval, and (iv) inventory levels of the plurality of products in the networked node environment.

3. The processor implemented method of claim 1, wherein the optimized entity actionable matrix comprises a plurality of parameters associated with corresponding the at least one of current state attribute.

4. A system for concurrent dynamic optimization of a replenishment suggestive actionable element in a networked node environment, comprising:
a memory storing instructions;
one or more communication interfaces; and
one or more hardware processors coupled to the memory via the one or more communication interfaces, wherein the one or more hardware processors are configured by the instructions to:
receive at least one current state attribute associated with the networked node environment at a predetermined time interval;
obtain an optimized entity actionable matrix by mapping the at least one of current state attribute and an associated actionable entity;
compute by a replenishment planner using a trained Artificial Intelligence (AI)/Machine Learning (ML) algorithm, a predictive replenishment matrix for an impending cycle of the networked node environment based on the optimized entity actionable matrix, wherein the replenishment planner is configured to import data from historical operation of all pre-existing components, in addition to one or more historical replenishment decisions, one or more forecasts, one or more predictions of upcoming demand and one or more operational characteristics of other components of the networked node environment, wherein the predictive replenishment matrix comprises a plurality of nodes and a plurality of pre-trained historical parameters, wherein the trained AI/ML algorithm is based on a technique including a reinforcement learning, wherein the AI/ML algorithm is trained offline to reduce computational effort and provides faster online operation of the trained AI/ML algorithm to generate replenishment plans, and wherein computing the predictive replenishment matrix comprising steps of:
generating a replenishment plan for an upcoming cycle of a supply chain network using the imported data and pre-trained parameters of the replenishment planner, wherein the pre-trained parameters are one or more parameters of an artificial neural network;
sending, over a network, the replenishment plan to an environmental simulator for evaluation and feedback, wherein the environmental simulator is a configured by a replenishment decision system to implement the replenishment plan to simulate operations and product flow;
providing the feedback by the environmental simulator to the replenishment planner, on replenishment order decisions based on overall performance; and
computing the predictive replenishment matrix by the replenishment planner on the replenishment plan and feedback exchange between the replenishment planner and the environmental simulator, wherein the replenishment planner is retrained, the pre-trained parameters of the replenishment planner are updated for future cycles of a supply chain network and the environmental simulator is adjusted based on a trigger from a performance and environment monitor regarding the performance of the replenishment plan and changes in the networked node environment;

identify a reward function for the predictive replenishment matrix, wherein the reward function comprises a computation of overall cost with regard to a realized revenue associated with aggregation of the plurality of nodes; and determine by a warehouse manager or a transport manager by using the trained AI/ML algorithm, at least one suggestive actionable element based on the reward function, wherein the at least one suggestive actionable element corresponds to at least one decision, wherein the reward function represent feedback from previous decisions, and wherein the at least one suggestive actionable element is implemented by the warehouse manager or the transport manager directly in a real supply chain system and ensures highest level of availability and least product wastage through an improved capacity utilization across all operations in the supply chain network, wherein the system provides bidirectional communication and negotiation between sequential components of the supply chain network over the network, and wherein the sequential components of the supply chain network include the replenishment planner, the environmental simulator, the warehouse manager and the transport manager.

5. The system of claim 4, wherein the at least one current state attribute comprises at least one of (i) product levels across a plurality of stores in the networked node environment, (ii) real-time tracking information of plurality of delivery vehicles, (iii) availability of labor in the predetermined time interval, and (iv) inventory levels of the plurality of products in the networked node environment.

6. The system of claim 4, wherein the optimized entity actionable matrix comprises a plurality of parameters associated with corresponding the at least one of current state attribute.

* * * * *